US006569558B1

(12) United States Patent
Takeuchi et al.

(10) Patent No.: US 6,569,558 B1
(45) Date of Patent: *May 27, 2003

(54) PRISMATIC HIGH RATE CELL

(75) Inventors: Esther S. Takeuchi, Williamsville, NY (US); Ralph T. Mead, Kenmore, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/690,314

(22) Filed: Oct. 17, 2000

Related U.S. Application Data

(63) Continuation of application No. 08/854,525, filed on May 12, 1997, now Pat. No. 6,136,466, which is a continuation of application No. 08/450,813, filed on May 25, 1995, now abandoned, and a division of application No. 08/205,874, filed on Mar. 3, 1994, now Pat. No. 5,549,717.

(51) Int. Cl.[7] .............................................. H01M 6/10
(52) U.S. Cl. ..................... 429/94; 429/211; 429/241; 607/5
(58) Field of Search ......................... 429/94, 241, 211; 607/5

(56) References Cited

U.S. PATENT DOCUMENTS

| 5,008,165 | A | * | 4/1991 | Schmode |
| 5,017,442 | A | * | 5/1991 | Watanabe et al. |
| 5,415,954 | A | * | 5/1995 | Gauthier et al. |
| 6,136,466 | A | * | 10/2000 | Takeuchi et al. |

* cited by examiner

Primary Examiner—John S. Maples
(74) Attorney, Agent, or Firm—Hodgson Russ LLP

(57) ABSTRACT

A solid cathode liquid organic electrolyte alkali metal high rate cell wherein a combination of an elongated alkali metal anode and elongated solid cathode with separator therebetween is wound to form an anode-cathode subassembly having a jellyroll type configuration and wherein the combination is shaped so that the resulting sub-assembly has a substantially rectangular cross-section. The anode-cathode sub-assembly is placed in a conductive cell casing of prismatic shape having opposed flat faces, a lead of either the anode or cathode is attached to the cell casing depending upon whether case positive or case negative electrical configuration is desired and a lead of the other of the anode or cathode is connected to an electrical connector means extending through the casing in an insulated manner. The anode and cathode and separator are in face-to-face contact throughout the entire cross-section of the subassembly.

9 Claims, 5 Drawing Sheets

US 6,569,558 B1

PRISMATIC HIGH RATE CELL

This application is a continuation of Ser. No. 08/854,525 filed May 12, 1997, now U.S. Pat. No. 6,136,464, which is a continuation of Ser. No. 08/450,813, filed May 25, 1995, now abandoned and a division of Ser. No. 08/205,874, filed Mar. 3, 1994, now U.S. Pat. No. 5,547,717.

BACKGROUND OF THE INVENTION

This invention relates to the art of lithium batteries, and more particularly to a new and improved solid cathode, liquid organic electrolyte lithium battery for delivering high current pulses.

One area of use of the present invention is a battery for operating an implantable cardiac defibrillator, although the principles of the present invention can be variously applied. The purpose of the implantable defibrillator is to prevent sudden death from lethal arrhythmia, and in operation the device continuously monitors the heart rate of the patient, is able to recognize ventricular fibrillation, and subsequently delivers a high energy shock to defibrillate the heart. In order to power this device, implantable high rate batteries have been developed which have the ability to deliver a current pulse and rapidly recover the open circuit voltage.

An example of a battery having high capacity, low self-discharge and good pulsing behavior at all levels is shown and described in U.S. Pat. No. 4,830,940. Manufacture of the cell stack assembly thereof includes, briefly, folding the anode to form a serpentine-like structure, placing individual cathode plates between the folds of the anode structure, and then making electrical connection including welding operations to individual leads of each of the plurality of cathode plates.

It would, therefore, be highly desirable to provide a new and improved high rate battery which reduces the time required to manufacture the cell stack assembly while maintaining the requisite safety and reliability standards in operation.

SUMMARY OF THE INVENTION

It is, therefore, a primary object of the present invention to provide a new and improved solid cathode liquid organic electrolyte alkali metal high rate battery and method of making the same.

It is a more particular object of the present invention to provide such a battery and method of making the same wherein the time required to manufacture the cell stack assembly is reduced significantly.

It is a further object of this invention to provide such a battery and method wherein manufacturing time is reduced while at the same time the requisite safety, performance and reliability standards in battery operation are maintained.

The present invention provides a solid cathode liquid organic electrolyte alkali metal high rate cell wherein a combination of an elongated alkali metal anode and elongated solid cathode with separator therebetween is wound to form an anode-cathode subassembly having a jellyroll type configuration and wherein the combination is shaped so that the resulting sub-assembly has a substantially rectangular cross-section, the shaping of the combination being done either simultaneously with or subsequent to the winding thereof. The anode-cathode sub-assembly is placed in a conductive cell casing of prismatic shape having opposed flat faces, a lead of either the anode or cathode is attached to the cell casing depending upon whether case positive or case negative electrical configuration is desired and a lead of the other of the anode or cathode is connected to an electrical connector means extending through the casing in an insulated manner. Liquid electrolyte is introduced to the anode-cathode sub-assembly in the casing whereupon the casing then is sealed closed. The foregoing provides a new and improved prismatic high rate battery which significantly reduces the time required to manufacture the cell stack assembly while maintaining the requisite safety and reliability standards in operation.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENTS

Figure 1:
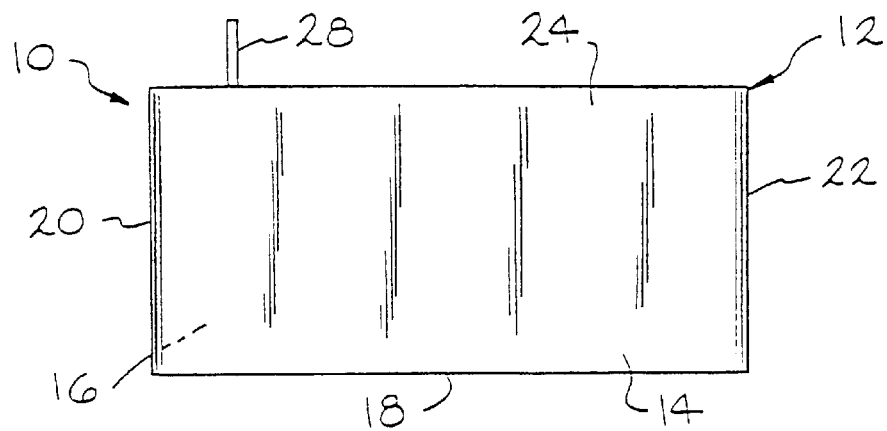
FIG. 1 is a side elevational view of a solid cathode liquid organic electrolyte alkali metal high rate battery according to one embodiment the present invention.
Figure 2:
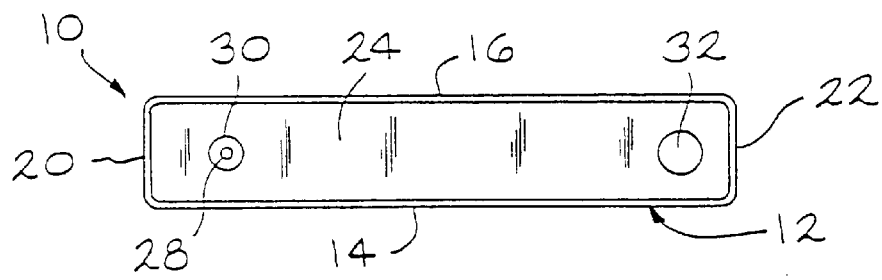
FIG. 2 is a top plan view thereof.

FIGS. 1 and 2 show a prismatic, high rate cell 10 according to the present invention. Cell 10 includes an electrically conductive casing 12 of metal such as stainless steel. Casing 12 includes a pair of flat-faced sidewalls 14,16 in opposed, substantially mutually parallel relation joined by a bottom wall 18 and a pair of end walls 20,22 which meet the sidewalls 14,16 at substantially rounded corners. Casing 12 is completed by a conductive lid 24 which is hermetically sealed thereto such as by welding. By prismatic it is meant that the cell casing includes flat faces on the side walls, wherein if desired the bottom and end walls can be curved in a manner which will be described.

The conductive casing 12 serves as one electrical terminal of cell 10 in a known manner. The opposite polarity terminal of cell 10 is provided by a terminal pin 28 extending outwardly from lid 24 and electrically insulated therefrom by an insulator element 30. Lid 24 is provided with a fill opening for supplying liquid electrolyte to the interior of casing 12 in a manner which will be described, and this opening is sealed closed by a cap or closure 32 welded to lid 24 in a known manner.

Figure 3:
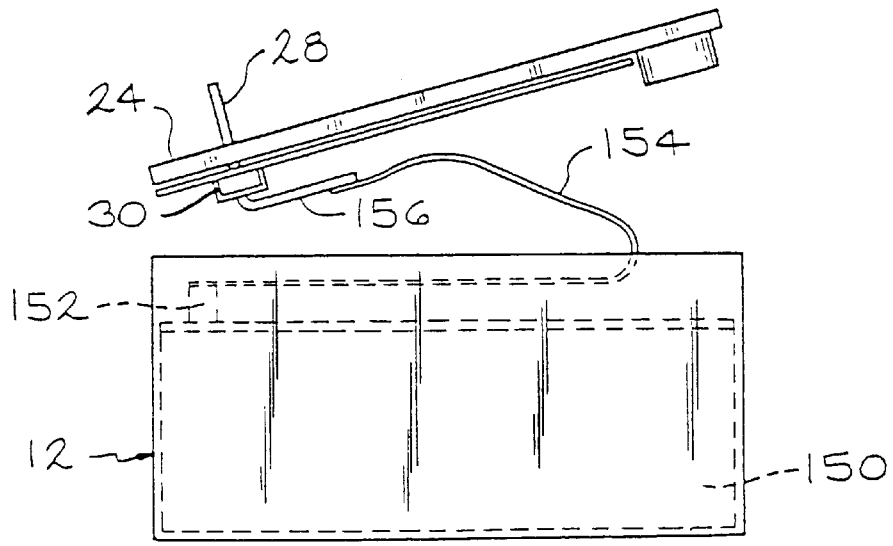
FIG. 3 is a developed view illustrating one of the final assembly stages in the manufacture of the cell of FIGS. 1 and 2.
Figure 4:
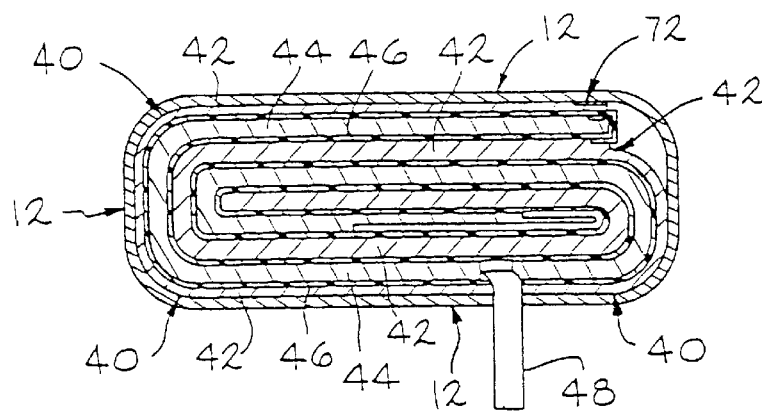
FIG. 4 is a sectional view taken about on line 4—4 in FIG. 3.

Referring now to FIGS. 3 and 4, the cell 10 of the present invention comprises an anode-cathode subassembly generally designated 40 which is in a jellyroll type configuration as known to those skilled in the art and which additionally, and in accordance with the present invention, is shaped to have a substantially rectangular cross-section. As will be described in detail presently, the jellyroll configuration of the anode-cathode subassembly advantageously simplifies the structure of and reduces the manufacturing time for the anode-cathode subassembly, and the rectangular cross-section of the anode-cathode subassembly enables it to be incorporated in a prismatic cell casing.

Briefly, the anode-cathode subassembly 40 comprises the combination of an elongated alkali metal anode 42, an elongated solid cathode 44 and separator 46 therebetween in a face-to-face relationship which combination is wound to form the anode-cathode subassembly 40 of jellyroll type configuration and which combination is shaped according to the present invention to have a substantially rectangular cross-section. One form of cathode 44 is shown in detail in FIG. 5.

Figure 5:
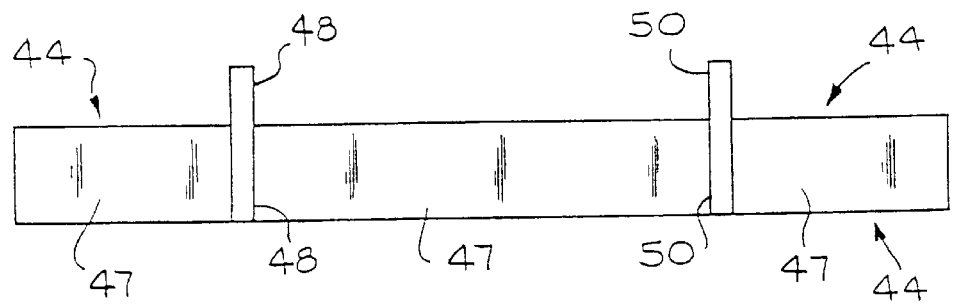
FIG. 5 is a side elevational view of one form of cathode assembly for the cell of FIGS. 1–4.

In particular, cathode 44 comprises a body 47 of cathode active material in the form of an elongated strip having a length many times greater than the width thereof and which is relatively thin. Cathode active material 47 can have various forms, and one exemplary material contains silver vanadium oxide. For a more detailed description of this illustrative cathode material and a method of making the same, reference may be made to U.S. Pat. No. 4,830,940 issued May 16, 1989 entitled "Non-Aqueous Lithium Battery", the disclosure of which is hereby incorporated by reference. Cathode 44 further comprises a cathode current collector (not shown in FIG. 5) in the form of a thin sheet of metal screen, for example of titanium, which extends along substantially the entire length and width of the cathode material 47 and is entirely embedded therein. The cathode 44 shown in FIG. 5 is provided with a pair of tabs or electrical leads 48,50 for making electrical connection thereto. One method for installing tabs 48,50 includes removing sections of cathode material 46 where tabs 48,50 are to be located as shown in FIG. 5 and then attaching the tabs 48,50 to the cathode current collector such as by spot welding. Tabs 48,50 are disposed in the plane of cathode body 47 and extend outwardly from one side edge of body 47 in substantially mutually parallel relation. Tabs 48,50 are relatively thin so that when installed as shown in FIG. 5 the outer surfaces of tabs 48,50 are substantially flush with the outer surface of cathode body 46. While two tabs 48,50 are shown, this is by way of illustration. Cathode 44 could have only one electrical lead or tab or even more than two, depending upon the size of the electrochemical cell in which the cathode 44 is to be included.

Figure 6:
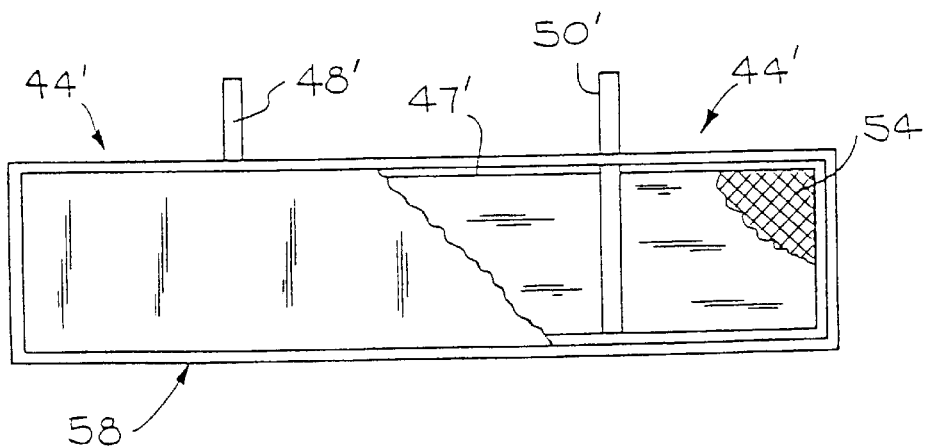
FIG. 6 is a side elevational view with parts broken away of another form of cathode assembly for the cell of FIGS. 1–4.

The form of cathode 44 shown in FIG. 5 is for use in an anode-cathode subassembly wherein a separate strip of separator material is sandwiched between the anode and cathode strips or wherein the anode is encased in separator material. FIG. 6 shows another form of cathode 44' which is encased or encapsulated in separator material. In FIG. 6 components of the cathode assembly which are identical to the components of the cathode assembly 44' shown in FIG. 5 are identified by the same reference numeral provided with a prime designation. Thus cathode assembly 44' in FIG. 6 includes an elongated, strip-like body 47', a portion of which is broken away in FIG. 6 to show the cathode current collector 54 embedded therein. Cathode 44' is provided with a pair of electrical leads or tabs 48',50' attached to current collector 54' substantially flush with body 47' in a manner similar to tabs 48,50 in FIG. 5 and extending from one side edge thereof in a manner identical to that of cathode 44 shown in FIG. 5. Cathode 44' of FIG. 6 is contained or encased in an envelope of separator material generally designated 58. One method for encasing cathode 44' includes providing a strip of separator material somewhat longer than cathode 44' and twice as wide. The separator strip is folded along the long axis. Cathode 44' is placed into the fold with the side edge thereof opposite extending tabs 48',50' abutting the fold. The three open edges of the separator are bonded by heat sealing which melts the separator and allows the upper layer to bond with the lower layer. A portion of the envelope of separator material 58 is broken away in FIG. 6 to show cathode body 47' inside and to show the heat sealed edges of separator 58. The material of separator 58 is of the type which does not block the flow of ions therethrough, and examples of suitable separator material are polypropylene and polyethylene such as Celgard 2400 separator material.

Figure 7:
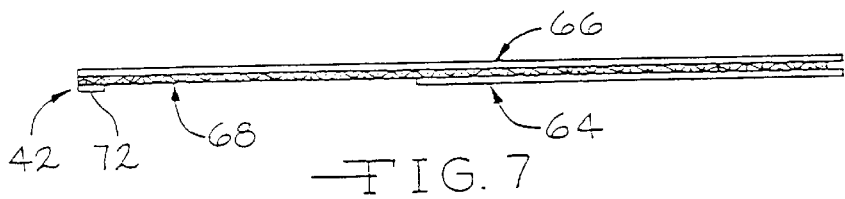
FIG. 7 is a side elevational view of an anode assembly for the cell of FIGS. 1–4.
Figure 8:
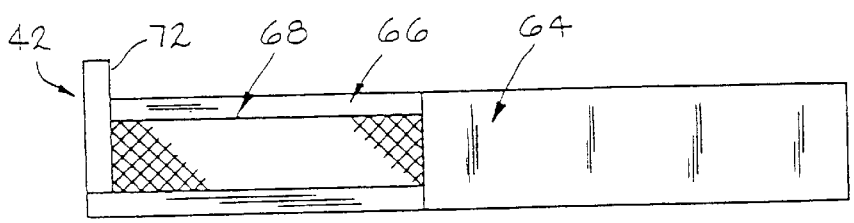
FIG. 8 is a top plan view of the anode assembly of FIG. 7.

The anode 42 of subassembly 40 is shown in detail in FIGS. 7 and 8 and comprises a pair of elongated alkali metal elements 64,66 preferably in the form of thin lithium strips, on opposite surfaces of an anode current collector 68 in the form of a screen of metal such as nickel. In particular, lithium strip 66 has a length many times the width thereof, and current collector 68 has a length slightly less than the length of lithium strip 66 and a width somewhat less than the width of strip 66. Lithium strip 64 extends from one end of the anode assembly 42, i.e. from the right-hand end as viewed in FIGS. 7 and 8, and terminates slightly beyond the mid-point of the length of anode assembly 42. The provision of one lithium anode strip being significantly shorter in length than the other is for a purpose which will be described presently. The anode assembly 42 is provided with an electrical lead or tab 72 for making electrical connection thereto. Tab 72 is located at one end of assembly 42, i.e. the end opposite the end having both lithium strips 64,66 and is attached to the exposed current collector 68 such as by spot welding. Tab 72 is disposed in the plane of anode assembly 42 and extends outwardly from one side edge thereof.

The form of anode assembly 42 shown in FIGS. 7 and 8 is for use in an anode-cathode subassembly wherein a separate strip of separator material is sandwiched between the anode and cathode strips or wherein the cathode is encased in separator material in a manner similar to that of cathode assembly 44' shown in FIG. 6.

Figure 9:
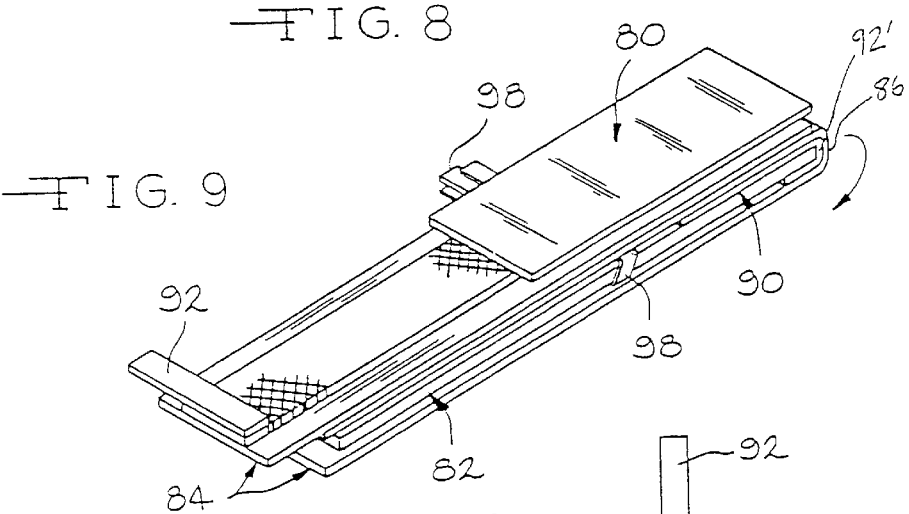
FIG. 9 is a perspective view illustrating the method of the present invention at a beginning stage thereof.

The method of the present invention begins by providing a combination of an elongated alkali metal anode, an elongated solid cathode and separator therebetween in a faceto-face relationship. One such combination is shown in FIG. 9 and includes an elongated lithium anode generally designated 80, an elongated solid cathode generally designated 82 and an elongated separator 84 therebetween in face-to-face relation with and between the anode 80 and cathode 82. Separator 84 is in the form of a strip of suitable separator material such as the aforementioned Celgard 2400 material, having a length about twice that of either anode 80 or cathode 82, and in the present illustration is folded about cathode 82 so that cathode 82 is within separator 84 as shown in FIG. 9. In other words, separator 84 is folded at a location about mid-way between the ends thereof and so as to be folded endwise of cathode 82 with the fold 86 of separator 84 being adjacent one end of cathode 82. Alternatively, separator 84 could be folded about anode 80 in a similar manner.

In the embodiment of the present invention illustrated in FIG. 9, there is provided an additional elongated separator 90 of relatively shorter length as compared to separator 84 and on the end of cathode 82 within fold 86 of separator 84. Separator 90 is a strip of suitable material, typically the same material as separator 84, and serves to provide extra insulation over the edge of cathode 82 in this embodiment wherein the separate or discrete separator strip 84 is provided rather than the cathode being encased in separator material. Separator 90 is folded at a location about one-quarter of the distance between the ends thereof and so as to be folded endwise of cathode 82 with the fold 92' of separator 90 being adjacent the end of cathode 82. In the alternative arrangement wherein separator 84 is folded about anode 80, separator 90 likewise would be folded about anode 80.

The next step in the method of the present invention is winding the combination to form an anode-cathode subassembly having a jelly roll type or coiled configuration. The combination is wound or rolled in a suitable manner, and one illustrative technique will be described in detail presently. The method of the present invention is characterized by shaping the combination so that the resulting anode-cathode subassembly has a substantially rectangular cross-section. The step of shaping the combination can be performed simultaneously with the step of winding the combination. Alternatively, after the combination is wound or coiled it can be shaped to have the substantially rectangular cross-section. In any event, FIG. 10 shows the anode-cathode subassembly after being wound in a jelly-roll type configuration and shaped to have a substantially rectangular cross-section.

Figure 10:
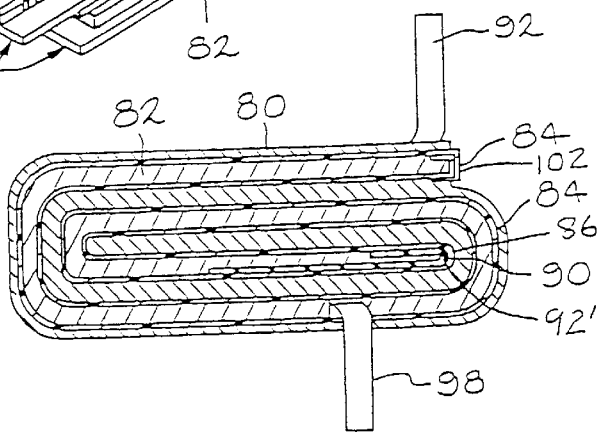
FIG. 10 is a top plan view of a cell stack assembly formed by the method of the present invention.

In particular, and referring to FIG. 10, anode tab 92 extends from an outermost surface of the anode-cathode subassembly and is available for connection to cell casing 12 in a suitable manner such as by welding. Also, the outer surface of one of the lithium anode strips is exposed around the periphery of the subassembly for contact with casing 12 to augment the electrical connection of anode 42 to cell casing 12 in this illustrative case negative electrical configuration. In this embodiment of the present invention, cathode 82 is provided with a single electrical lead or tab 98 which extends from the subassembly for making electrical connection to terminal pin 28 in a manner which will be described. FIG. 10 illustrates the role of separator strip 90 providing added insulation over the one end edge of cathode 82. The opposite end edge of cathode 82 is sealed or protected by folding an extending end portion 102 of separator 84 over the end of cathode 82 in the manner shown in FIG. 10.

FIG. 10 also illustrates the reason for having one of the anode strips, i.e. anode strip 64, shorter in length than the other anode strip 66 as previously described in connection with FIGS. 7 and 8. Around the periphery of the anode-cathode subassembly as shown in FIG. 10 there is only one surface of cathode 82 available for operative contact with anode 80. Therefore, this portion of the length of anode 80 requires only one lithium strip. Within the subassembly of FIG. 10 it is seen that opposed surfaces of cathode 82 are available for operative contact with anode 80 and this therefore requires two lithium strips on opposite surfaces of the anode current collector. This form of anode structure advantageously reduces the amount of lithium required which, in turn, yields savings in cost and size for the resulting cell.

The anode-cathode subassembly shown in FIG. 10 is placed in the conductive cell casing 12, the leads 92 and 98 are connected to the casing and terminal pin 28, respectively, liquid electrolyte is introduced to the subassembly in casing 12 and the casing is hermetically sealed, all in a manner which will be described in further detail presently.

Figure 11:
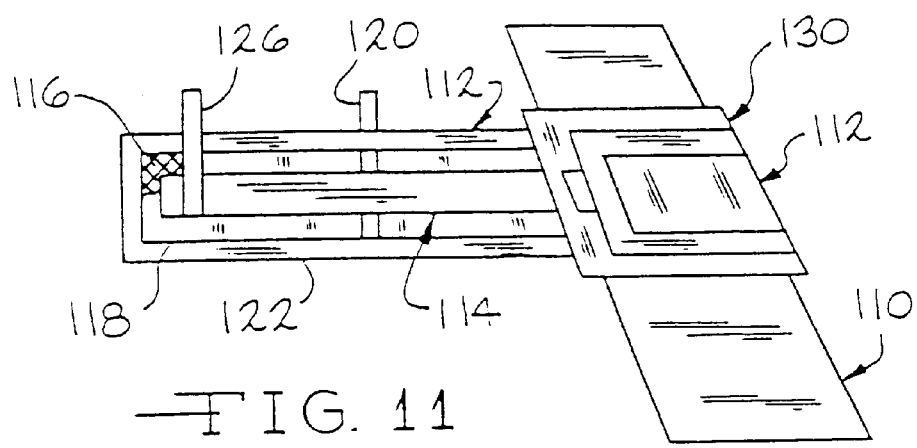
FIG. 11 is a perspective view with parts removed illustrating the shaping step of the method of the present invention at an initial stage thereof.
Figure 12:
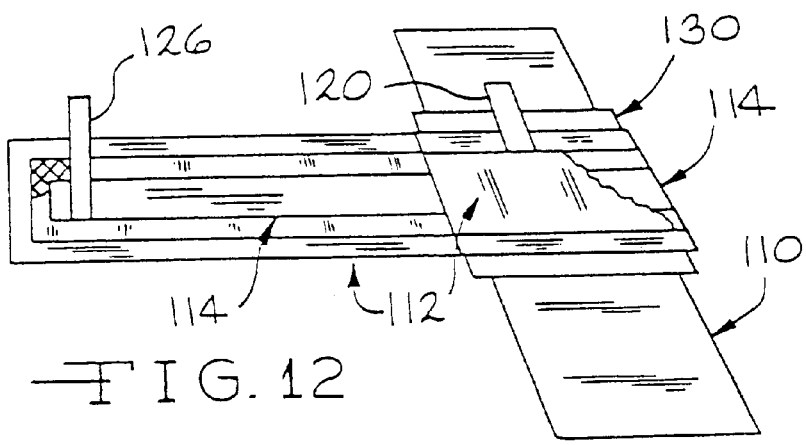
FIG. 12 is a perspective view illustrating the method of FIG. 11 at a subsequent stage thereof.

As previously described, the method of the present invention is characterized by shaping the combination of anode, cathode and separator so that the resulting anode-cathode subassembly has a substantially rectangular cross-section wherein the shaping can be performed simultaneously with winding or coiling the combination or performed after the combination has been wound or coiled. FIGS. 11 and 12 illustrate the method of the present invention wherein the step of shaping the combination is performed simultaneously with the step of winding or coiling the combination. One way of carrying out this embodiment of the present invention is by using a mandrel of substantially rectangular configuration, i.e. cross-section, about which the combination is wound.

Referring first to FIG. 11 it illustrates the initial stage of the method which includes one wrap of the anode-cathode-separator combination around a mandrel 110 of rectangular cross-section. In the anode-cathode-separator combination shown in FIG. 11, cathode 112 is similar to cathode 44' shown in FIG. 6 which is encased or encapsulated in separator material and anode 114 is similar to anode 42 shown in FIGS. 7 and 8. In particular, FIG. 11 illustrates cathode 112 with parts removed to show cathode current collector 116, cathode material 118, cathode lead 120 and separator material 122 enveloping the same in a manner somewhat similar to that of FIG. 6. Anode 114 has a lead 126 extending therefrom in a manner similar to that shown in FIGS. 7 and 8. As shown in FIG. 11, an insulating layer 130 can be provided around mandrel 110 between the mandrel and the anode-cathode-separator combination.

FIG. 12 shows the arrangement of FIG. 11 wherein the anode-cathode-separator combination has been wrapped more than once around mandrel 110. A section of the cathode portion wrapped around mandrel 110 has been removed to show the anode portion wrapped around mandrel 110. Once the wrapping is completed, mandrel 110 is removed from the combination.

Figure 13:
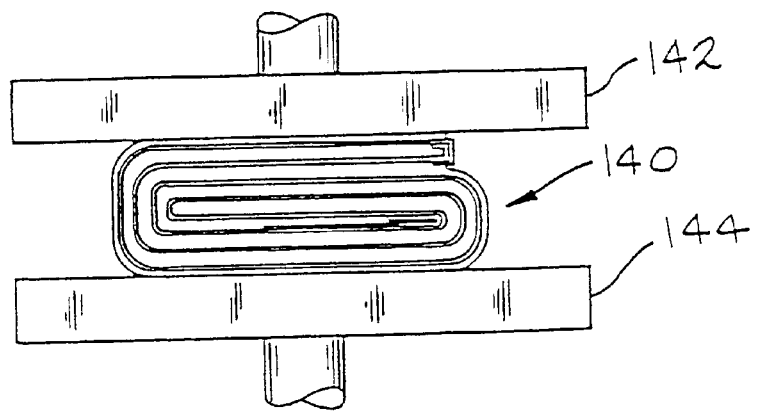
FIG. 13 is a diagrammatic view of an alternative mode of shaping in the method of the present invention.

Thus, FIGS. 11 and 12 show the method of the present invention wherein the shaping of the combination to provide an anode-cathode subassembly of substantially rectangular cross-section is performed simultaneously with winding or coiling the combination. Alternatively, the shaping can be performed after the combination has been wound or coiled and this is illustrated diagrammatically in FIG. 13 wherein a previously spirally wound or coiled anode-cathode-separator combination 140 is placed in a suitable pressing fixture including jaws or pressing members 142,144 which act on opposite surface portions of combination 140 to force or shape the combination to have a substantially rectangular cross-section.

As previously described, the anode-cathode subassembly formed by the method of the present invention is placed in the cell casing 12, and the substantially rectangular cross-section of the subassembly enables it to be properly received in a prismatic casing 12 of the type shown in FIGS. 1–3. The anode lead from the subassembly is connected to casing 12 by welding and the exposed grid surface of the anode contacts the inner surface of casing 12. FIG. 3 shows an anode-cathode subassembly 150 which has been so placed in casing 12 and where the anode lead (not shown) has been welded to casing 12 as described. The cathode leads, one shown at 152 in FIG. 3 are welded to a connecting lead 154 which, in turn, is welded to an extension 156 of terminal pin 28 which is insulated from lid 24 by an insulator structure 30 in a known manner. Accordingly, the relatively few leads requiring welding operations for making electrical connections and the manner of making the connections result in a significant simplification and reduction in time of this portion of the manufacture of the cell.

After the foregoing operation is completed, lid 24 is welded to casing 12 to provide an hermetic seal in a known manner, liquid electrolyte such as that disclosed in U.S. Pat. No. 4,830,940 is introduced through the fill opening in lid 24 to the subassembly 150, whereupon cap 32 is welded to lid 24 to complete the hermetic seal in a known manner.

Figure 14:
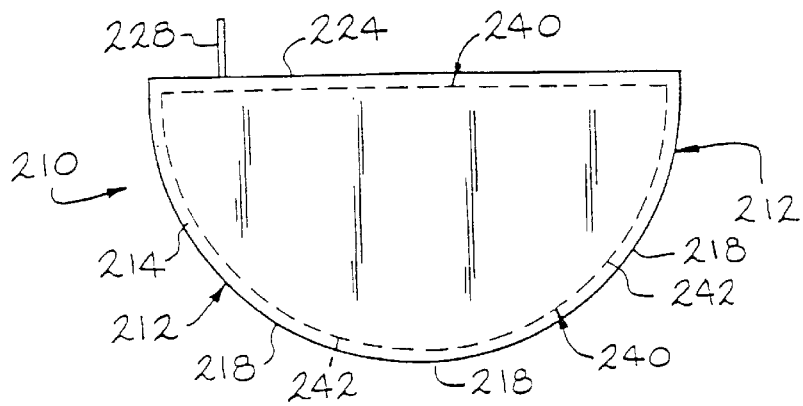
FIG. 14 is a side elevational view of a solid cathode liquid organic electrolyte alkali metal high rate battery according to another embodiment of the present invention.
Figure 15:
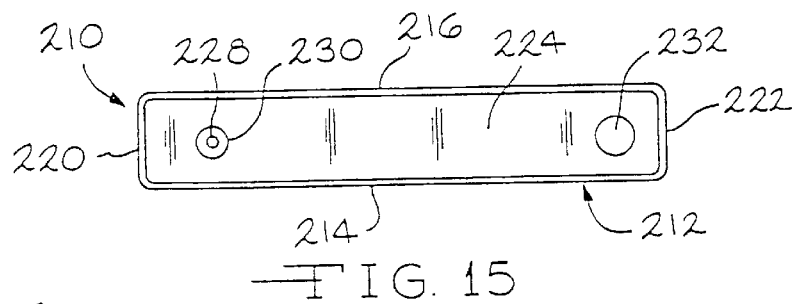
FIG. 15 is a top plan view thereof.

FIGS. 14 and 15 show a prismatic, high rate cell 210 including an electrically conductive casing 212 of metal such as stainless steel including a pair of flat-faced sidewalls 214,216 in opposed, substantially mutually parallel relation joined by a curved bottom wall 218. A pair of end walls 220,222 meet the sidewalls 214,216 at substantially rounded corners. If desired, end walls 220,222 also could be curved. Casing 212 is completed by a conductive lid 224 which is hermetically sealed thereto such as by welding.

The conductive casing 212 serves as one electrical terminal of cell 210 in a known manner. The opposite polarity terminal of cell 210 is provided by a terminal pin 228 extending outwardly from lid 224 and electrically insulated therefrom by an insulator element 230. Lid 224 is provided with a fill opening for supplying liquid electrolyte to the interior of casing 212 in a manner like that described for cell 10, and this opening is sealed closed by a cap or closure 232 welded to lid 224 in a known manner.

Except for the curved bottom wall 218 of cell 210 and the flat bottom wall 18 of cell 10, the two prismatic cells 10 and 210 according to the present invention are identical. Thus, like cell 10, the cell 210 of FIGS. 14 and 15 includes an anode-cathode subassembly 240 which is substantially similar to the anode-cathode subassembly 40 of the cell 10, i.e. has a substantially rectangular cross-section, and is provided with a curved surface 242 to accommodate the curved bottom wall 218 of cell casing 212. In order to provide the curved surface 242 of subassembly 240, the anode and cathode electrodes together with the separator are provided with a scalloped formation along one edge thereof, as compared to the rectangular shaped anode and cathode electrodes and separator of cell 10 where both the edges are straight.

Figure 16:
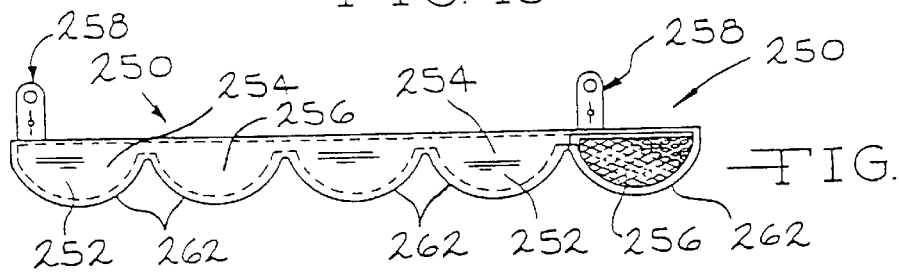
FIG. 16 is a side elevational view with a portion broken away of an anode assembly for the cell of FIGS. 14 and 15.

In particular, and referring now to FIG. 16, there is shown an anode 250 which, like anode 42 comprises a pair thin elongated alkali metal or lithium strips 252,254 on opposite surfaces of a screen 256 of metal such as nickel. The anode assembly 250 is provided with electrical tabs or leads 258 for making electrical connection thereto. In accordance with this embodiment of the present invention, anode 250 is formed to include a plurality of scallops 262 along one edge thereof. The scallops 262 are equal in size and degree of curvature, and each scallop 262 has a curvature substantially equal to the curvature of surface 242 of subassembly 240. Thus, when anode 250 along with the cathode and separator are wound to form subassembly 240 in a manner similar to that of subassembly 40, the scallops 262 are substantially in registry with each other. As in the previous embodiment, anode 250 can be encapsulated in separator material, or a separate elongated strip of separator material can be provided.

Figure 17:
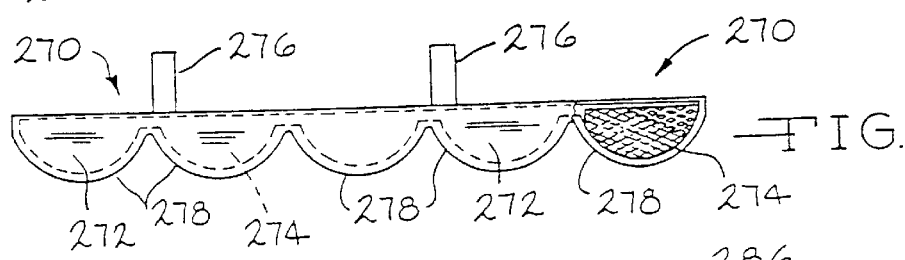
FIG. 17 is a side elevational view with a portion broken away of a cathode assembly for the cell of FIGS. 14 and 15.

FIG. 17 shows a cathode 270 which, like cathode 44, comprises an elongated strip of cathode active material 272 with a cathode current collector 274 embedded therein, collector 274 being a thin screen of metal such as titanium. The cathode assembly 270 is provided with electrical leads or tabs 276 for making electrical connection thereto. In accordance with this embodiment of the present invention, cathode 270 is formed to include a plurality of scallops 278 along one edge thereof The scallops 278 are equal in size and degree of curvature, and each scallop 278 has a curvature substantially equal to the curvature of surface 242 of subassembly 240. Thus when cathode 270 along with the anode and separator are wound to form subassembly 240 in a manner similar to that of subassembly 40, the scallops 278 are substantially in registry with each other. As in the previous embodiment, cathode 270 can be encapsulated in separator material, or a separate elongated strip of separator material can be provided.

Figure 18:
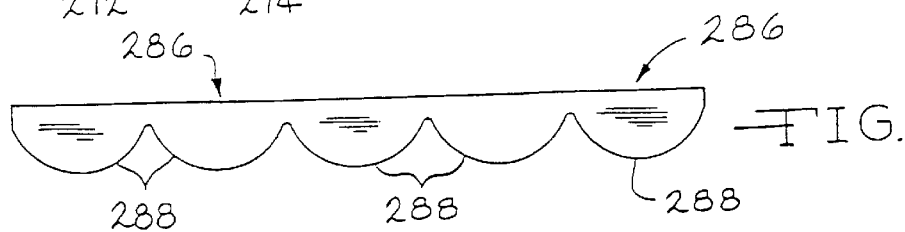
FIG. 18 is a side elevational view of a separator for use in the cell of FIGS. 14 and 15.

Referring now to FIG. 18 there is shown the elongated strip 286 of separator material mentioned hereinabove and which is the same material as the separator in cell 10. In accordance with this embodiment of the present invention, separator 286 is formed to include a plurality of scallops 288 along one edge thereof. The scallops 288 are equal in size and degree of curvature, and each scallop 288 has a curvature substantially equal to the curvature of surface 242 of subassembly 240. Thus, when separator 286 along with the anode and cathode are wound to form subassembly 240 in a manner similar to that of subassembly 40, the scallops 288 are substantially in registry with each other.

In order to form subassembly 240, anode 250 and cathode 270 are placed in face-to-face relation with the scallops 262 and 278, respectively, in registry with each other. If neither anode 250 nor cathode 270 is encapsulated in separator material, separator strip 286 is sandwiched therebetween with the scallops 288 thereof in registry with the scallops 262 and 278. Then the combination is wound and shaped to have a rectangular cross-section in a manner similar to the embodiment of FIGS. 1–13.

It is therefore apparent that the present invention accomplishes its intended objects. While embodiments of the present invention have been described in detail, that is for the purpose of illustration, not limitation.

What is claimed is:

1. A solid cathode liquid electrolyte alkali metal high rate cell for delivering successive high current pulses and rapidly recovering the cell open circuit voltage and comprising:
   a) a casing of electrically conductive material and of prismatic shape having opposed flat faces;
   b) an elongated alkali metal anode and an elongated solid cathode wound in a jellyroll type configuration and shaped in a substantially rectangular cross-section to provided an anode-cathode subassembly which is contained in the casing;

c) a separator located between the anode and the cathode to prevent direct contact therebetween;

d) a non-aqueous liquid electrolyte in said casing and operatively contacting said anode and said cathode;

e) means for electrically connecting one of said anode or cathode to said casing;

f) means for electrically connecting the other of said anode or cathode to an electrical connector means extending through said casing in an insulated manner;

g) means for hermetically sealing said casing; and h) said elongated anode and said elongated cathode being wound with said elongated anode land said elongated cathode and separator therebetween being in face-to-face contact throughout the entire cross-section of the anode-cathode sub-assembly.

2. A cell according to claim 1, wherein said anode is of lithium.

3. A cell according to claim 1, wherein said anode and said cathode are of substantially the same length.

4. A cell according to claim 1, wherein said anode is connected electrically to said casing to provide a cell of case negative electrical configuration.

5. A cell according to claim 1 wherein the anode-cathode subassembly has a periphery, wherein one of said anode or cathode has a portion of the length thereof extending around the periphery of said anode-cathode subassembly and wherein said portion of the length thereof has a thickness substantially less than that of the remainder of the length thereof thereby reducing the amount of said anode or cathode included in said subassembly thereby providing savings in material cost and size of said anode-cathode subassembly.

6. A solid cathode liquid electrolyte alkali metal high rate cell comprising:

a) a casing of electrically conductive material and of prismatic shape having opposed flat faces;

b) an elongated alkali metal anode and an elongated solid cathode wound in a jellyroll type configuration and shaped in a substantially rectangular cross-section to provided an anode-cathode subassembly which is contained in the casing;

c) a separator located between the anode and the cathode to prevent direct contact therebetween;

d) a non-aqueous liquid electrolyte in said casing and operatively contacting said anode and said cathode;

e) means for electrically connecting one of said anode or cathode to said casing;

f) means for electrically connecting the other of said anode or cathode to an electrical connector means extending through said casing in an insulated manner;

g) means for hermetically sealing said casing;

h) said elongated anode and said elongated cathode being wound with said elongated anode and said elongated cathode and separator therebetween being in face-to-face contact along substantially each of the entire lengths thereof; and i) the faces of said casing being disposed in planes, said casing having a curved wall between the opposed flat faces thereof and defining an arc disposed in a plane substantially parallel to the planes of said opposed flat surfaces, and said anode-cathode subassembly having a curved surface which conforms to said curved wall of said casing.

7. A cell according to claim 6, wherein each of said anode and cathode has a plurality of scallops along one edge thereof wherein each of said scallops has a curvature corresponding to said curved surface of said anode-cathode subassembly.

8. A cell according to claim 7, further including an elongated separator between said anode and cathode and having a plurality of scallops along one edge thereof wherein each of said scallops has a curvature corresponding to said curved surface of said anode-cathode subassembly.

9. In combination:

an implantable cardiac defibrillator; and a solid cathode liquid electrolyte alkali metal high rate call comprising:

a) a casing of electrically conductive material and of prismatic shape having opposed flat faces;

b) an elongated alkali metal anode and an elongated solid cathode wound in a jellyroll type configuration and shaped in a substantially rectangular cross-section to provided an anode-cathode subassembly which is contained in the casing;

c) a separator located between the anode and the cathode to prevent direct contact therebetween;

d) a non-aqueous liquid electrolyte in said casing and operatively contacting said anode and said cathode;

e) means for electrically connecting one of said anode or cathode to said casing;

f) means for electrically connecting the other of said anode or cathode to an electrical connector means extending through said casing in an insulated manner;

g) means for hermetically sealing said casing; and h) said elongated anode and said elongated cathode being wound with said elongated anode and said elongated cathode and separator therebetween being in face-to-face contact along substantially each of the entire lengths thereof.

* * * * *

UNITED STATES PATENT AND TRADEMARK OFFICE
CERTIFICATE OF CORRECTION

PATENT NO. : 6,569,558 B1
DATED : May 27, 2003
INVENTOR(S) : Takeuchi et al.

It is certified that error appears in the above-identified patent and that said Letters Patent is hereby corrected as shown below:

Column 9,
Line 13, paragraph h), "land" should be -- and --

Signed and Sealed this

Nineteenth Day of August, 2003

JAMES E. ROGAN
*Director of the United States Patent and Trademark Office*